June 24, 1924.

K. AIRD ET AL

GAS HEATER

Filed Feb. 27, 1922

Inventors
Kenneth Aird
George William Wortley
By
Attorney

June 24, 1924.

K. AIRD ET AL

GAS HEATER

Filed Feb. 27, 1922

Inventors
Kenneth Aird
George William Wortley
By
James L. Norris
Attorney

June 24, 1924.

K. AIRD ET AL 1,499,137

GAS HEATER

Filed Feb. 27, 1922

Inventor
Kenneth Aird
George William Wortley

Attorney

Patented June 24, 1924.

1,499,137

UNITED STATES PATENT OFFICE.

KENNETH AIRD AND GEORGE WILLIAM WORTLEY, OF FALKIRK, SCOTLAND, ASSIGNORS TO R. AND A. MAIN, LIMITED, OF EDMONTON, LONDON, ENGLAND, A BRITISH COMPANY.

GAS HEATER.

Application filed February 27, 1922. Serial No. 539,785.

*To all whom it may concern:*

Be it known that KENNETH AIRD and GEORGE WILLIAM WORTLEY, subjects of the King of Great Britain, residing at Falkirk, Scotland, have invented certain new and useful Improvements in Gas Heaters, of which the following is a specification.

This invention relates to gas heaters and consists in detail Improvements in various parts thereof, the main object being the supply of a boiling burner and trivet to the plate of a gas heater, and the improvements further consist in the provision of an injector burner and kettle supports which are all accurately lined up with respect to each other. Separate and independent control is given to both the fire and boiling burner, and a loose plate is provided which effectually conceals the mechanism when the boiling burner is not in use and a guard is provided to prevent damage to the radiants when the boiling burner is in use.

The entire fittings of the trivet are interchangeable, the same plate serving either a plain fire or one with a boiling burner and to convert a plain fire to a boiling burner it is only necessary to connect an extra cock to the injector, fix the boiling burner by one screw to the fuel plate and drop the boiling burner fender into position.

The invention will be clearly understood from the following description aided by the annexed drawings in which—

Figure 8:
Figure 8 is a section on the line $b\ b$ of Figure 7.
Figure 9:
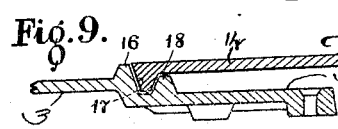
Figure 9 is a section on line $c\ c$ of Figure 7.
Figure 4:
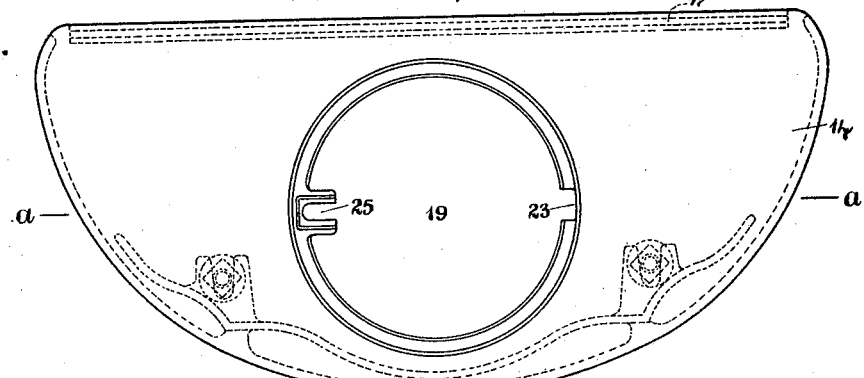
Figure 4 is a plan of the trivet and showing the trivet front in dotted lines.
Figure 5:
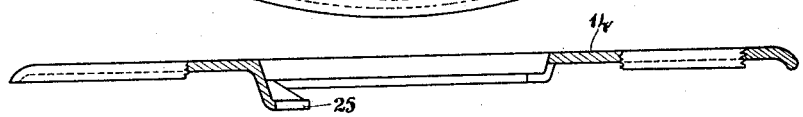
Figure 5 is a part section on the line $a\ a$ of Figure 4
Figure 6:
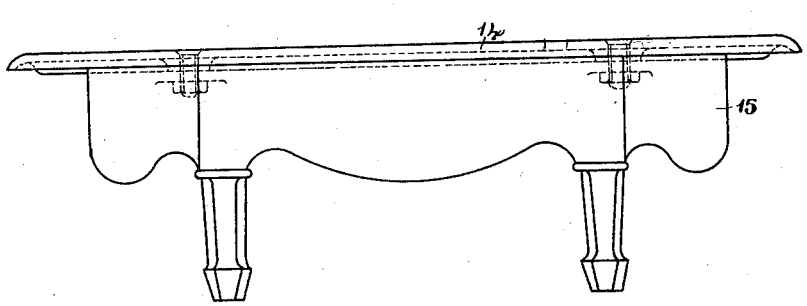
Figure 6 is a front view of the trivet.
Figure 7:
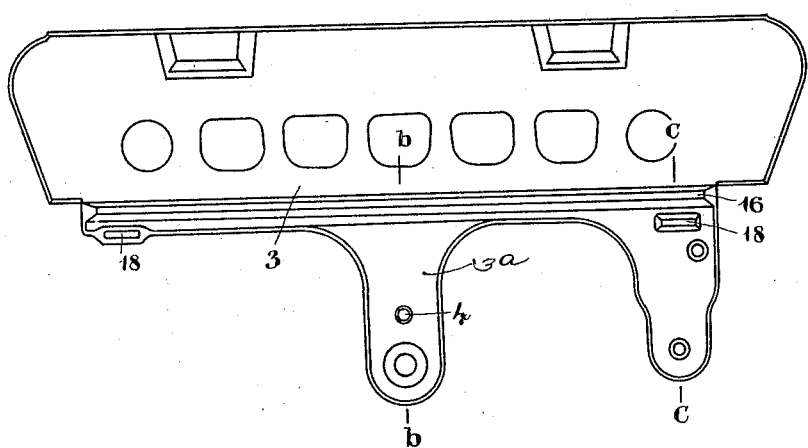
Figure 7 is a plan of the fuel plate.
Figure 16:
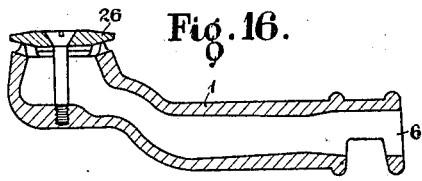
Figure 16 is a longitudinal section of the burner.
Figure 17:
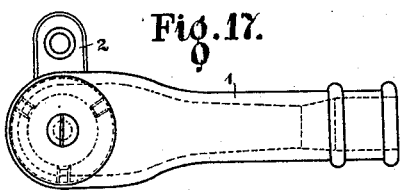
Figure 17 is a plan of the burner.

The gas boiling burner 1 (Figures 16 and 17) is preferably of the slit variety and has a lug 2 projecting from one side thereof, which lug extends under a lug $3^a$ projecting forwardly from the front edge of the plate 3, preferably midway between the ends of the latter (Figs. 7 and 8), and is secured to said lug $3^a$ in any suitable manner, as by a bolt inserted through an aperture in the lug 2 and an aperture 4 in the lug $3^a$, the other or inlet end 6 of the boiling burner 1 being slipped over the injector 7.

Figure 10:
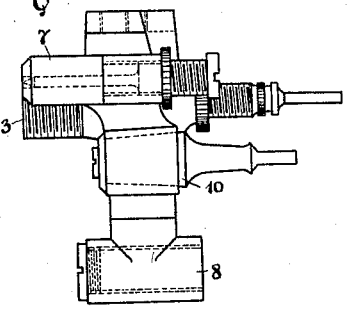
Figure 10 is a front elevation of the gas taps.
Figure 2:
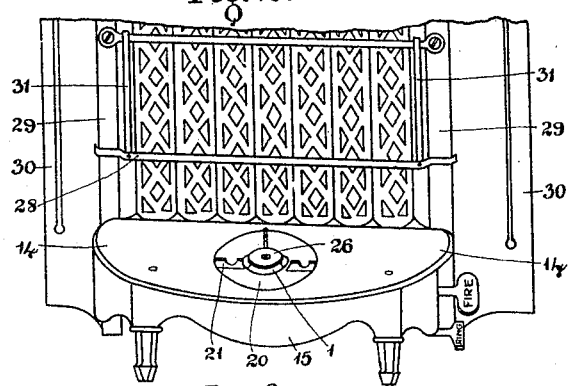
Figure 2 is a similar view with the loose plate removed and showing the boiling burner.
Figure 11:
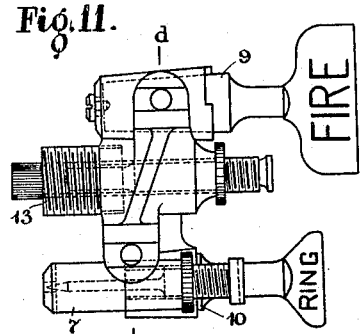
Figure 11 is a plan of the gas taps.
Figure 3:
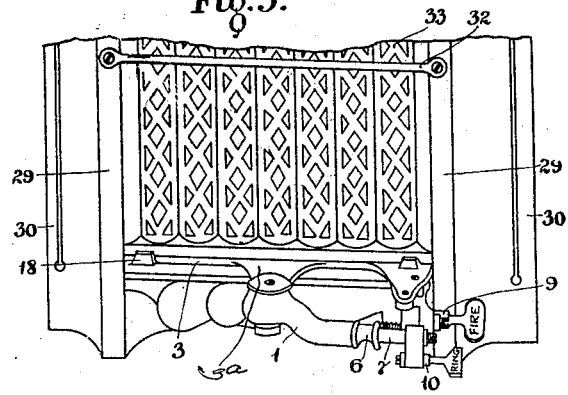
Figure 3 is a similar view with the loose plate, trivet and trivet front removed and showing the boiling burner.
Figure 12:
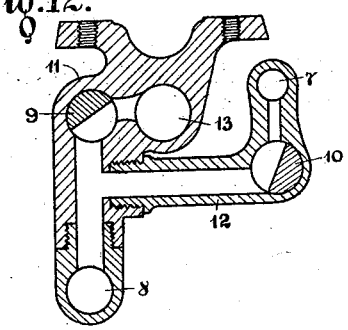
Figure 12 is a section on the line $d\ d$ of Figure 11.

The injector and taps Figures 10, 11 and 12 are of the dual variety leading from one source of supply at 8 and the plugs 9, 10 are each operated separately to control its particular burner. As will be seen from Figure 12 the plug casings are in two castings 11, 12 screwed together and then screwed or bolted to the lug which projects forwardly from the plate 3 (Figure 3) so that the injector ends 7 and 13 are positioned in the mixing chambers of the burners in correct alignment, the injector end 13 being in the burner 5 and the injector end 7 at the boiling burner 1.

The trivet table 14 Figures 2, 4, 5 and 6 is made to fit over the plate 3 and is supported adjacent its forward edge by a vertically arranged plate 15, the whole forming a complete fender which fits the front of the heater, the trivet table 14 having a flange 17 on its under side adjacent its rear edge which flange is adapted, when the trivet table is in place, to seat between a longitudinal flange 16 on the plate 3 adjacent the forward edge of the latter and a pair of studs 18 projecting upwardly from the plate 3 forwardly of the depression 16, and thus be held firmly and in proper position with regard to the burner.

Figure 13:
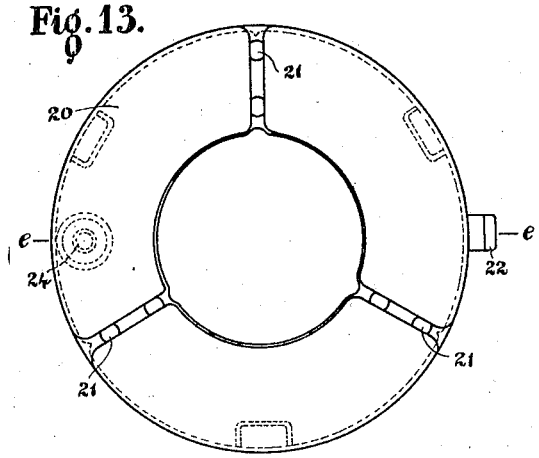
Figure 13 is a plan of a ring plate carried by the trivet.
Figure 14:
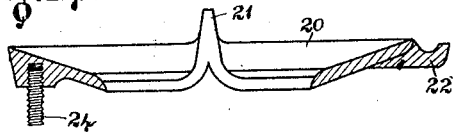
Figure 14 is a section on the line $e\ e$ of Figure 13.
Figure 18:
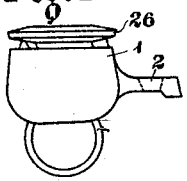
Figure 18 is an end view of the burner.
Figure 15:
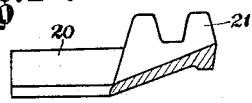
Figure 15 is a fragmentary view of the pot support.
Figure 19:
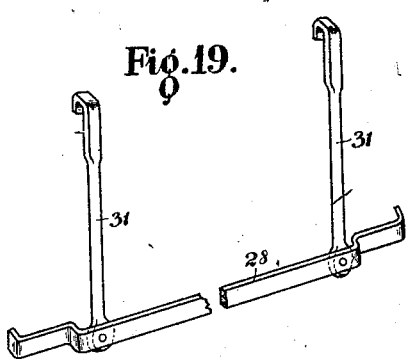
Figure 19 is a view of the guard.
Figure 20:
Figure 20 is a front elevation broken and showing section of guard rail.
Figure 21:
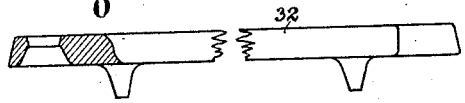
Figure 21 is a part sectional plan of the guard rail.

The centre of the trivet table 14 is provided with an opening 19 constructed to carry a ring plate 20 (Figures 13 and 14) having radial arms 21 forming supports for the kettle or the like and this ring plate 20 is provided with a hooked lug 22 which engages with a lip 23 on the trivet table and at a diametrically opposite portion of the plate is a hole carrying a screw 24 which extends through a jawed opening 25 in the trivet table and is fixed to the trivet table by a screw nut. This ring plate is positioned over the boiling burner nozzle 26 which projects through the central aperture in the plate 20.

Figure 1:
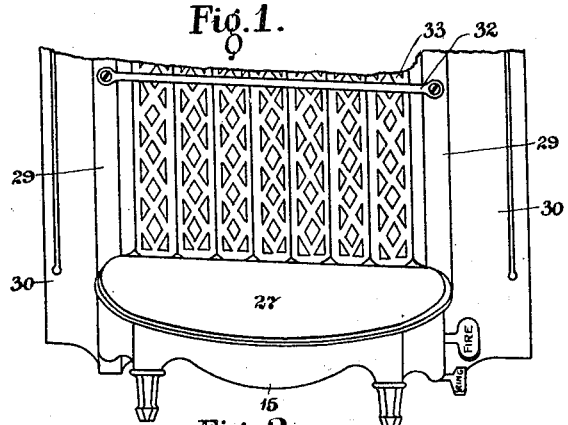
Figure 1 is a front view of part of a gas heater with the loose plate in position.

The radial arms 21 of the ring plate 20 project slightly above the trivet table so that the products of combustion can pass under the kettle resting thereon and when the boiling burner is not required, the trivet table and ring plate are covered by a loose plate or cover 27, as shown in Figure 1, to give the stove an ordinary appearance.

We employ a rod 28 shaped at the ends to engage the side edges 29 of the back brick or frame 30 and provided with two pivoted or fixed hooked rods 31, 31 which are hooked on to the cross rod 32 which hold the radiants 33 in place. The rod 28, the hooked rods 31 and cross rod 32 form an efficient guard against the radiants 33 being injured by the kettle or other device when being placed upon or removed from above the boiling ring.

What we do claim as our invention, and desire to secure by Letters Patent is:—

1. In a gas heater, a plate, radiants supported by the plate, a burner below and in front of said radiants, a trivet table in front of said radiants over said burner and having a flange on its under side, said trivet table having an aperture centered over said burner, studs on the plate for engagement with the flange on said trivet table to hold said table in proper relation to the burner, a lug projecting forwardly from said plate and to which said burner is secured, injector means secured to the plate for supplying gas to said burner, a vertically arranged plate connected to and supporting the trivet table adjacent its forward edge, a kettle support in the aperture in the trivet table, a plate for covering the trivet table, and a guard for the radiants comprising vertically and horizontally connecting bars.

2. In a gas heater, a plate, radiants supported by the plate, a burner in front of and below the forward edge of said plate, a trivet table in front of said radiants having an aperture centered over said burner and provided with a flange on its underside the plate having studs projecting from its upper side for engagement with said flange to hold the trivet table in proper relation to the burner, a lug projecting from the plate to which said burner is secured, injector means secured to the plate for supplying gas to said burners, said trivet table being connected adjacent its forward edge to a vertically placed plate, a kettle support in said aperture, and a plate for covering the trivet.

3. In a gas heater, a plate, radiants supported by said plate, a burner in front of and below the forward edge of said plate, a trivet table in front of said radiants having an aperture centered over said burner and a flange on its underside, studs on the plate for engagement with the flange of the trivet table to hold the latter in proper relation to the burner, and a lug projecting from the plate to which said burner is secured.

In testimony whereof we have hereunto set our hands in presence of two subscribing witnesses.

KENNETH AIRD.
GEORGE WILLIAM WORTLEY.

Witnesses:
W. J. FOBSERR,
ALEX. R. DOW.